Patented Apr. 25, 1944

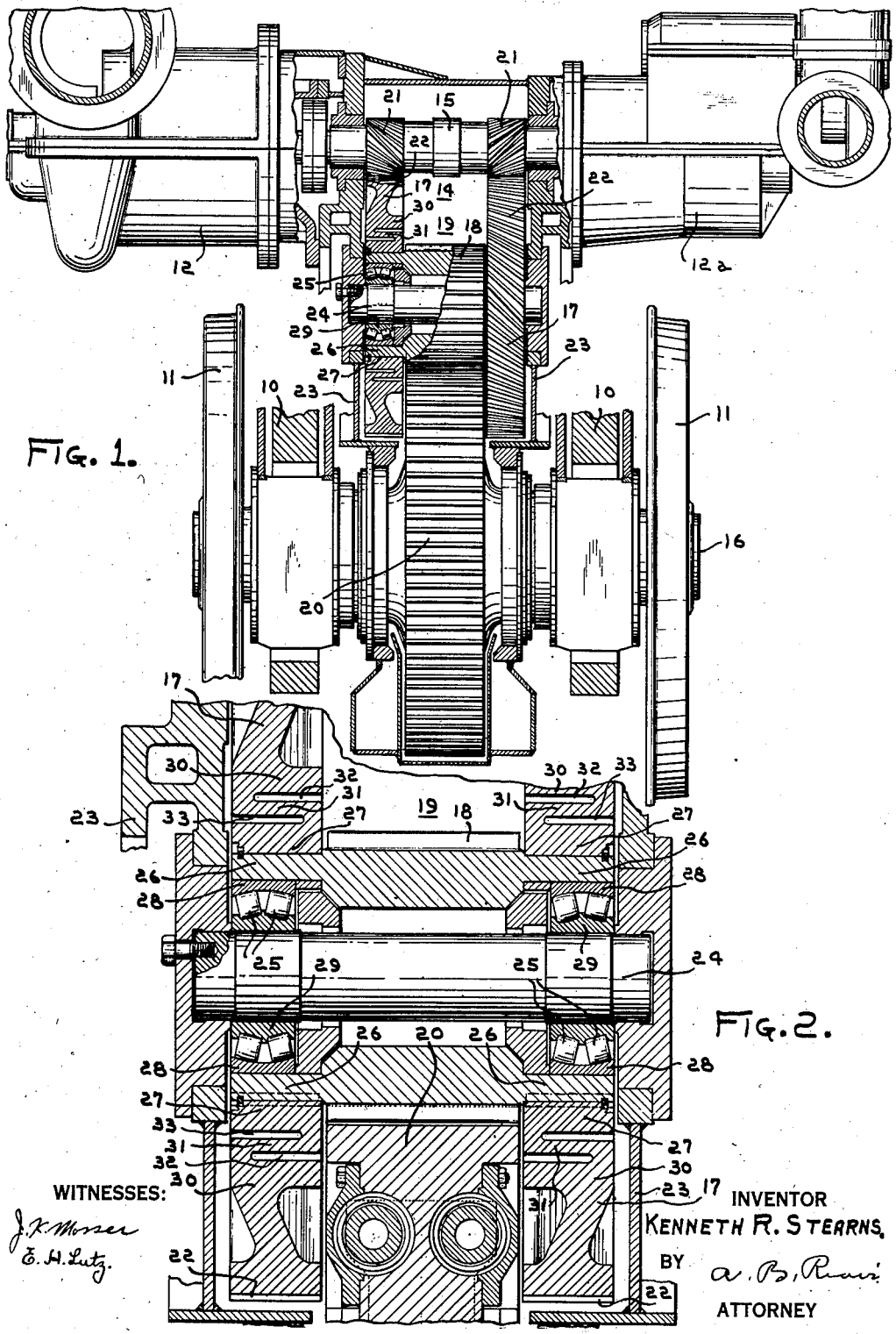

2,347,580

UNITED STATES PATENT OFFICE 2,347,580

REDUCTION GEARING APPARATUS

Kenneth R. Stearns, Springfield, Pa., assignor to Westinghouse Electric & Manufacturing Company, East Pittsburgh, Pa., a corporation of Pennsylvania Application October 3, 1942, Serial No. 460,608

4 Claims. (Cl. 74—434)

The invention relates to reduction gearing for transmitting power from an elastic-fluid turbine to the drivers of a locomotive and it has for an object to provide a construction of high-speed gear such that the hub of the latter will not be stretched because of centrifugal force in such a manner as to result in looseness with respect to associated parts.

Where reduction gearing is employed to transmit power from an elastic-fluid turbine to the drivers of a locomotive, the structure of the latter constitutes a limiting factor responsible for transmission problems. One of these is the double-reduction, high-speed gear and low-speed pinion assembly and the mounting of the latter in the space available between drivers. The low-speed pinion and the high-speed gears are separately formed, but they must be connected as a unit in true coaxial relation and the connection must be adequate for the torque to be transmitted. These objectives are best satisfied by forming the low-speed pinion with spigot portions at the ends and upon which the hubs of the high-speed gears have a press fit.

The high-speed gear and low-speed pinion assembly is carried by a jack shaft and it is necessary that it have bearing relation with respect to the latter. Because of the limited space available between drivers, it is desirable to telescope the bearings with respect to the ends of the assembly, that is, to have the bearings telescoped within the high-speed gear hubs. As roller bearings are preferably used for supporting the assembly, the pinion spigot portions are preferably ground for a light press fit on the outer bearing races; however, centrifugal force acting on the high-speed gears stretches or elongates the latter in a radial direction and the enlargement from standstill to maximum speed may be greater than the fit tolerance permitted between the pinion spigot portions and the outer bearing races. If the press fit between the gear and the pinion is great enough to remain tight at maximum speed, the pinion spigot will follow the gear bore radially outward and become loose on the outer bearing race. Furthermore, the press fit required may be sufficient to bend the ends of the low-speed pinion teeth inward appreciably at low speed and maximum torque conditions. A further object of the present invention is to provide such a construction of high-speed gear that centrifugal force applied to the latter will not result in stretching of its hub to such an extent as to result in the looseness pointed out and which will not call for a press fit so tight as to bend the ends of the pinion.

A further object of the invention is to provide a high-speed gear and low-speed pinion assembly wherein the hubs of the high-speed gears are isolated from and connected to the rims thereof in such a manner that centrifugal force acting on the rims and the connecting structure and expanding the latter will not result in stretching or radial elongation of the hubs to such an extent as to lead to the undesired effects pointed out.

A further object of the invention is to provide an assembly of the above character wherein the body portion of each high-speed gear is connected to the hub portion thereof by a radially-flexible connection so as to avoid stretching or radial elongation of the hub on account of radial expansion of the body portion due to centrifugal force.

A more particular object of the invention is to provide a construction of the character referred to wherein the hub portion of the gear is connected to the body portion thereof by means of an axially-extending flexible sleeve whose ends are integral with the hub and body portions.

These and other objects are effected by the invention as will be apparent from the following description and claims taken in connection with the accompanying drawing, forming a part of this application, in which:

Fig. 1 is a detail, fragmentary, transverse sectional view of a locomotive showing the improved gearing for transmitting power from a turbine to the drivers; and, Fig. 2 is an enlarged fragmentary, axial sectional view of the high-speed gear and low-speed pinion assembly.

Referring to the drawing more in detail, there is shown a locomotive frame 10 and supporting wheels including driving wheels 11. Ahead and reversing turbines 12 and 12a are carried by the frame and power is transmitted therefrom to the drivers by means of double-reduction gearing, at 14, such gearing including a high-speed pinion 15 driven from the turbine rotors, a high-speed gear 17 meshing with the high-speed pinion, a low-speed pinion 18 unitary and coaxial with the high-speed gears 17 and connected to the latter to form a gear and pinion aggregate or unit, at 19, and a low-speed gear 20 meshing with the low-speed pinion, the low-speed gear being connected in any suitable manner to a driving axle 16 for a pair of driving wheels 11.

As shown, the high-speed pinion is of the double-helical type, it including opposed helical pinion portions 21. The same is true of the high-speed gear 17, the latter including a pair of opposed helical gear elements 22 which are secured to ends of the low-speed pinion 18 to form the gear and pinion aggregate at 19.

Preferably, the reduction gearing, at 14, is supported by a gear casing 23 mounted on the frame 10, and the gear casing carries the turbines 12 and 12a. To provide bearings holding the high-speed gear and low-speed pinion assembly or aggregate, at 19, in correct relative relation with respect to the high-speed pinions and the low-speed gear, it is necessary to provide bearing means serving this purpose and carried by the gear casing. As shown, the gear casing has a jack shaft 24 supporting the bearings.

Because of the limited space available between drivers, it is desirable to have the high-speed gear and low-speed pinion aggregate, at 19, carried by bearings telescoped with respect to the ends thereof and mounted on the jack shaft 24. Preferably, roller bearings 25 are arranged in this manner and serve this purpose.

As manufacturing processes make it desirable that the high-speed gears 22 and the low-speed pinion 18 of the aggregate, at 19, shall be manufactured separately and then be secured together, it is necessary that the connecting structure shall be such as to assure of coaxial relation of the gears and the pinion, and strength thereof adequate for the torque to be transmitted. To this end, the low-speed pinion 18 is formed with end spigot portions 26 and the high-speed gears 22 have hub or bore portions 27 which are pressed on the spigot portions. The spigot portions 26 are also ground so as to have a pressed fit relation with respect to the outer races 28 of the roller bearings, the inner races 29 of the latter being mounted on the jack shaft 24.

With the construction just described, the expansion or radial elongation or enlargement of the bore of each high-speed gear 22 due to centrifugal force from standstill to maximum speed is greater than the fit tolerance permitted on the roller bearings. If the pressed fit between the high-speed gears and the low-speed pinion spigot portions is sufficient to remain tight at maximum speed, the spigot portions 26 will follow the gear bore radially outward and become loose on the outer bearing races 28. Furthermore, the press fit required for this purpose may be sufficient to bend the ends of the low-speed pinion teeth inward appreciably at low speed and maximum torque conditions.

The principal objective of the present invention is to provide a construction of the character so far described wherein the bore or hub portion of the high-speed gears are isolated from the body or rim portions thereof so as to avoid expansion on account of expansion of the body or rim portion due to centrifugal force, with the result that the spigot portions may have pressed fit relations with respect to the hubs and the bearings, with the pressed fit between the spigot portions and the gear hubs sufficiently tight for the torque to be transmitted without necessitating such a degree of tightness as to result in bending or deformation of the pinion. In other words, by relieving the hubs of expansion on account of expansion of the rims, it becomes possible to preserve the pressed fit relations under all operating conditions and without the necessity of resorting to pressed fitting under such high pressures as to result in deformation or bending of any of the structural components, particularly the pinion teeth. Thus, it is assured that the component parts of the gear and pinion assembly, at 19, may be connected in true coaxial relation without undesired deformation and adequate for the transmission of the required torque under all operating conditions without any loosening developing in the connection or between the pinion and the outer races of the roller bearings.

To avoid expansion of the high-speed gear bore portions or hubs 27 on account of centrifugal force of the body or rim portions thereof, it is preferred to isolate each hub from the associated body or rim or gear body portion 30 by means on an axially-extending sleeve 31 whose opposite ends are joined to the hub and rim portions.

To provide high-speed gear members 22 meeting all operating requirements and having flexible sleeves 31 connecting the hub and rim or body portions thereof, each gear preferably comprises an inner annular body of metal of uniform thickness in an axial direction. Inner and outer annular grooves 32 and 33 are milled in opposite directions from opposite sides of the gear body to separate the hub portions 27 from the body or rim portion 30 and to provide an axially-extending sleeve 31 having its ends integral with the hub and the rim or body portions. The grooves are so located with respect to the body as to provide an adequate hub portion 27, while at the same time relieving the latter of stresses due to expansion of the rim or body portion. The axial length of the flexible sleeve 31 and the thickness thereof in a radial direction are such as to provide a structure adequate to resist axial thrust of the helical teeth of the gear, to transmit the driving torque, and for raising the lateral and torsional critical speeds while, at the same time, being sufficiently flexible radially to avoid practically the transmission of any radial shear to the hub.

From the foregoing, it will be seen that, as the hub is relieved of radial forces due to expansion of the rim or body portion, the pressure required to secure an adequate press fit thereof on the pinion spigot involves lessening of bending of the pinion teeth as such pressure is reduced. Further, as the centrifugal expansion of the hub at maximum speed is reduced, the required press fit pressure is reduced. Therefore, the gear is adequate to transmit torque to the pinion under all operating conditions without any loosening of the gear with respect to the pinion spigot or of the latter with respect to the outer race of the bearing.

While the invention has been shown in but one form, it will be obvious to those skilled in the art that it is not so limited, but is susceptible of various changes and modifications without departing from the spirit thereof, and it is desired, therefore, that only such limitations shall be placed thereupon as are specifically set forth in the appended claims.

What is claimed is:

1. In a high-speed gear and low-speed pinion assembly of a double-reduction gear for transmitting power from an elastic-fluid turbine to the drivers of a locomotive wherein hub portions of the gears have pressed fit relations with respect to pinion end spigot portions and the latter having pressed fit relations with respect to outer races of telescoped roller bearings, means for avoiding expansion of each gear hub portion due to expansion of the associated gear rim portion under influence of centrifugal force, said means comprising torque-transmitting structure connecting the hub and rim portions of each gear and which is flexible radially.

2. In a high-speed gear and low-speed pinion assembly of a double-reduction gear for transmitting power from an elastic-fluid turbine to the drivers of a locomotive wherein hub portions of the gears have pressed fit relations with respect to pinion end spigot portions and the latter having pressed fit relations with respect to outer races of telescoped roller bearings, means for avoiding expansion of each gear hub portion due to expansion of the associated gear rim portion under influence of centrifugal force, said means comprising a sleeve having its ends connected to the hub and rim portions of each gear and which provides a radially flexible torque-transmitting driving connection.

3. In a high-speed gear and low-speed pinion assembly of a double-reduction gear for transmitting power from an elastic-fluid turbine to the drivers of a locomotive wherein hub portions of the gears have pressed fit relations with respect to pinion end spigot portions and the latter have pressed fit relations with respect to outer races of telescoped roller bearings, means for avoiding expansion of each gear hub portion due to expansion of the associated gear rim portion under influence of centrifugal force, said means comprising a sleeve which is coaxial with the hub and rim portions of each gear, which has its ends formed integrally with such portions, and which provides a radially flexible torque-transmitting connection.

4. The combination as claimed in claim 3 wherein the hub and rim portions of each gear are provided by a unitary and integral structure and the connecting sleeve portion is provided by a pair of coaxial grooves formed in the structure and extending in opposite directions from opposite sides thereof.

KENNETH R. STEARNS.